United States Patent
Nonaka

(10) Patent No.: US 6,366,736 B1
(45) Date of Patent: Apr. 2, 2002

(54) DISTANCE MEASURING APPARATUS FOR CAMERA

(75) Inventor: Osamu Nonaka, Sagamihara (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/591,109

(22) Filed: Jun. 9, 2000

(30) Foreign Application Priority Data

Jun. 16, 1999 (JP) .......................................... 11-170037

(51) Int. Cl.$^7$ ............................................... G03B 13/00
(52) U.S. Cl. ........................ 396/106; 396/25; 396/50; 396/52
(58) Field of Search .............................. 396/105, 106, 396/107, 108, 109, 110, 25, 50, 52

(56) References Cited

U.S. PATENT DOCUMENTS

| | | | |
|---|---|---|---|
| 4,255,029 A | | 3/1981 | Freudenschuss ............. 354/25 |
| 4,592,638 A | * | 6/1986 | Kaneda et al. ................ 396/80 |
| 5,144,358 A | * | 9/1992 | Tsuru et al. ................... 396/50 |
| 5,784,654 A | * | 7/1998 | Saito et al. ................... 396/104 |

FOREIGN PATENT DOCUMENTS

| | | |
|---|---|---|
| JP | 48-52231 | 7/1973 |
| JP | 55-35399 | 3/1980 |
| JP | 9-005611 | 1/1997 |
| JP | 11-83474 | 3/1999 |

* cited by examiner

Primary Examiner—Russell Adams
Assistant Examiner—Arthur A Smith
(74) Attorney, Agent, or Firm—Straub & Pokotylo; John C. Pokotylo

(57) ABSTRACT

The present invention provides a distance measuring apparatus for a camera capable of deciding priority of a plurality of types of autofocusing methods automatically and rapidly and achieving high-speed, accurate focusing under various shooting conditions. This device uses jointly, for example, two types of AFs: active type AF whereby a distance to the subject is measured based on a signal generated by reception of reflected signal light from a subject when distance measuring light is cast on the subject, and passive type AF whereby a distance to the subject is measured by using a light reception signal that corresponds to the subject image, and changes the priority of both types of AFs in response to an output of the shooting condition detecting part and performs a distance measuring operation.

28 Claims, 8 Drawing Sheets

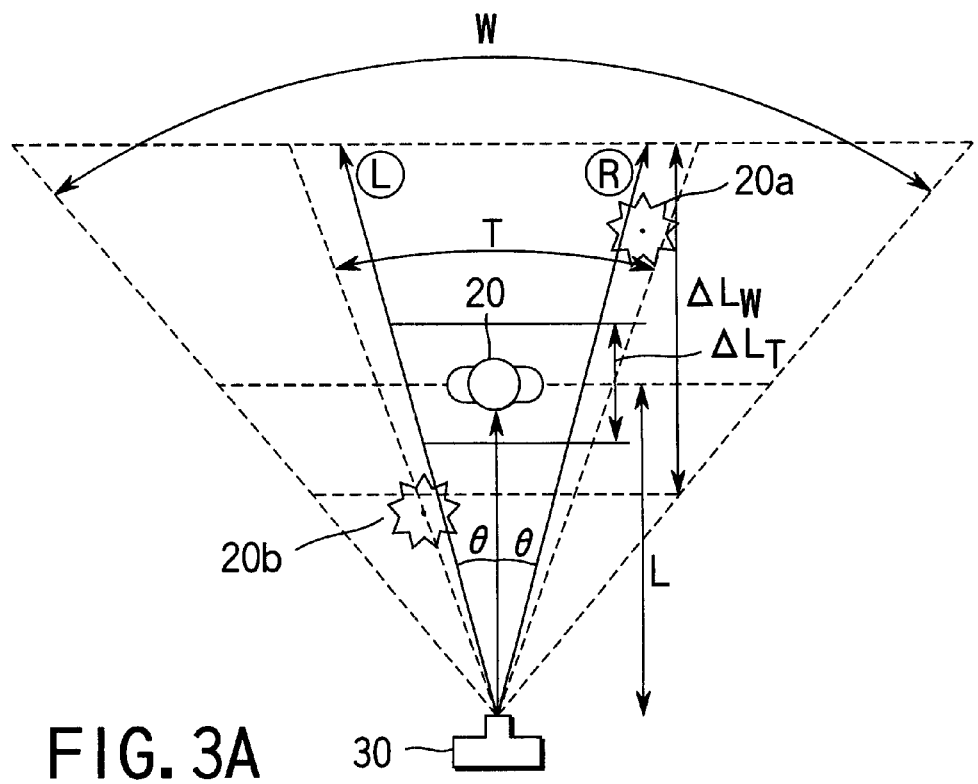
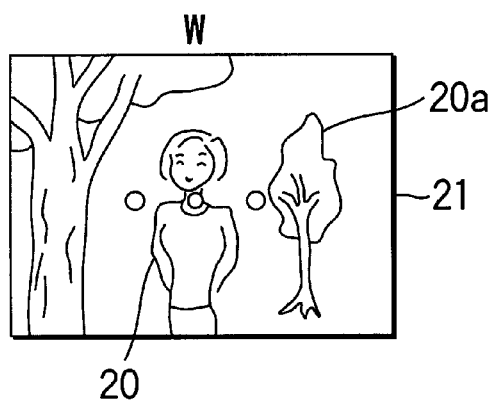 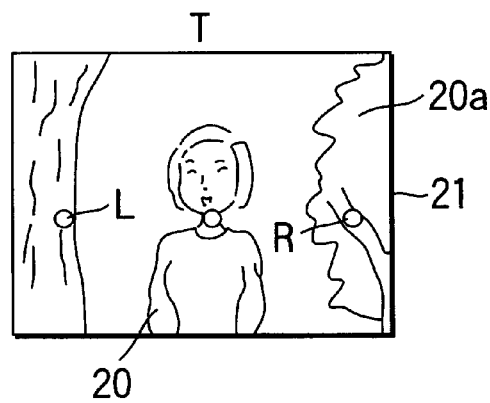
FIG. 3A
FIG. 3B  FIG. 3C

DISTANCE MEASURING APPARATUS FOR CAMERA

CROSS-REFERENCE TO RELATED APPLICATIONS

This application is based upon and claims the benefit of priority from the prior Japanese Patent Application No. 11-170037, filed Jun. 16, 1999, the entire contents of which are incorporated herein by reference.

BACKGROUND OF THE INVENTION

The present invention relates to a distance measuring apparatus for the camera that adopts a so-called hybrid type autofocusing (hereinafter referred to as AF) which uses active type AF and passive type AF jointly.

There is a remarkably progress in a technology for the AF, whereby focusing is carried out automatically, in line with a trend in cameras toward automatization.

Such AF technologies can be divided broadly into two categories: the passive method where mainly an image signal of a subject is utilized; the active method where light is cast from a camera and the reflected light signal is detected.

In the passive type AF, light-converted signals which are outputted by sensor arrays are converted from analog signals to digital signals through A/D conversion, and further the digital signals so obtained are put into arithmetical operations. Therefore, a number of steps such as integration control, designation of an area or areas, cross correlation calculation for detecting coincidence of images are necessary, especially in a dark scene a longer time is required to integrate photocurrent, resulting in distance measurement with a long time lag. Moreover, accurate distance measurement was not able to be performed if the obtained image signals do not have enough contrast.

On the contrary, in the active type AF, since light is cast on the subject and reflected light from the subject is received to perform distance measurement; the active type AF is hard to be affected by the luminance of the subject and further said to be suitable to measure a subject with low contrast.

In consideration of such features of the two type of AFs, in the Japanese Unexamined Patent Application Publications No. 48-52231 and No. 55-35399, disclosed are technologies where the active type AF is used jointly with the passive type AF under conditions of low luminance, low contrast, etc. with the aim of compensating week points peculiar to the passive type AF as described above.

Further, in the Japanese Unexamined Patent Application Publications No. 9-5611, disclosed is a technology for a distance measuring apparatus where the AF is normally carried out by both the active type AF and the passive type AF, but when a night scene-shooting mode is set, the AF operation in a passive distance measuring part is disabled by the control of a CPU and only an active distance measuring part is allowed to carry out the AF.

In the Japanese Unexamined Patent Application Publications No. 11-83474, disclosed is such a technology for a distance measuring apparatus that, when a taking lens is set to wide-angle, the active type AF is carried out, and when the lens is set to telephoto, the passive type AF and the active type AF are carried out simultaneously.

However, although the active type AF has a feature of being suitable for low-contrast and low-luminance scenes, it has a drawback that correct distance measurement cannot be performed in cases where no reflected signal light comes back to the camera, that is, camera-to-subject distance is too far or the reflectance of the subject is too low. A problem concerning which type AF should be chosen from the two types each having different features to achieve better focus is very difficult to decide, and if a distance measuring apparatus takes too much time for its choosing, a shutter time lag associated with this idle time may cause loss of a shutter chance. Moreover, a technology whereby a distance measuring method is changed in accordance with the change of a shooting mode, as disclosed in the Japanese Unexamined Patent Application Publication No. 9-5611 for a distance measuring apparatus, needs an operation of a photographer beforehand; therefore the concept of this technology is quite different from an idea of full automatic operation.

As for the technology disclosed in the Japanese Unexamined Patent Application Publication No. 11-83474, it is difficult to say that this method can cope with every shooting conditions because only active type AF is carried out when the taking lens is set to wide-angle.

BRIEF SUMMARY OF THE INVENTION

The present invention is accomplished in consideration of the problems and it is the object thereof to provide a distance measuring apparatus for the camera wherewith the camera can realize high-speed, accurate focusing in every shooting conditions by automatically deciding priority of two distance measuring methods, namely the active and passive methods, rapidly.

To achieve the object, in a first embodiment according to the present invention, provided is a distance measuring apparatus comprising:

first distance measuring means for performing distance measurement by casting distance measuring light on a subject and using reflected light from the subject; second distance measuring means by using an image signal of the subject; service condition detecting means for detecting a condition when the camera is being held; and controlling means for performing distance measurement by changing the first and second distance measuring means in accordance with an output of this service condition detecting means.

In a second embodiment according to the present invention, provided is a distance measuring apparatus for a camera having a plurality of distance measuring methods, being designated as first and second methods, comprising:

service condition detecting means for detecting the condition when the camera is being held; zooming detecting means for detecting a zooming condition of the camera; and controlling means for changing the distance measuring methods in accordance with the holding condition and the zooming condition.

In a third embodiment according to the present invention, provided is a distance measuring apparatus for the camera having a plurality of distance measuring methods, that is, the first and second distance measuring methods, comprising:

zooming detecting means for detecting the zooming condition of the camera; image signal detecting means for detecting the image signal of a subject; and controlling means for changing the distance measuring methods in accordance with a result of judging reliability of the image signal.

In the fourth embodiment according to the present invention, provided is a distance measuring apparatus for the camera having a plurality of distance measuring methods, that is, the first and second distance measuring methods, comprising:

zooming detecting means for detecting the zooming condition of the camera; and controlling means for changing a sequence of the first and second distance measuring methods in accordance with the zooming condition detected by this zooming detecting means.

In the fifth embodiment according to the present invention, provided is a distance measuring apparatus for the camera having a plurality of distance measuring methods, that is, the first and second distance measuring methods, comprising:

shooting condition detecting means for detecting a shooting condition; and controlling means for changing the sequence of the first and second distance measuring methods in accordance with the shooting condition detected by this shooting condition detecting means.

In the sixth embodiment according to the present invention, provided is a distance measuring apparatus for the camera comprising:

first distance measuring means for measuring a distance to a subject based on a signal generated when the distance measuring light was cast on the subject positioned at the center in a viewfinder picture frame and reflected light from the subject is received;

second distance measuring means for measuring a distance to the subject by using a light reception signal corresponding to an image of the subject;

focal distance information detecting means for detecting focal distance information of the taking lens of the camera;

controlling means capable of distance measurement by means of the first and second distance measuring means regardless of an output of the focal distance information detecting means;

characterized in that the controlling means changes the priority of the first and second distance measuring means in response to the output of the focal distance information detecting means.

In the seventh embodiment according to the present invention, provided is a distance measuring apparatus for the camera comprising:

condition detector sensor for detecting a condition when the camera is being held;

a light sensor for detecting light from the subject;

a controlling circuit for selectively changing a passive distance measuring mode where distance measurement is performed based on an image signal outputted from the light sensor and an active distance measuring mode where distance measurement is performed based on a reflected light signal outputted from the light sensor when light is cast on the subject and reflected light from the subject is received;

characterized in that the control circuit changes the passive distance measuring mode and the active distance measuring mode in accordance with the output of the above-motioned condition detector sensor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3A is a view for explaining the relationship between the angle of view and the subject, FIG. 3B is a view showing one example of the viewfinder picture frame, and FIG. 3C is a view showing other example of the viewfinder picture frame.

DETAILED DESCRIPTION OF THE INVENTION

Hereafter, with reference to the drawings, the embodiments according to the present invention will be described.

Figure 1A:
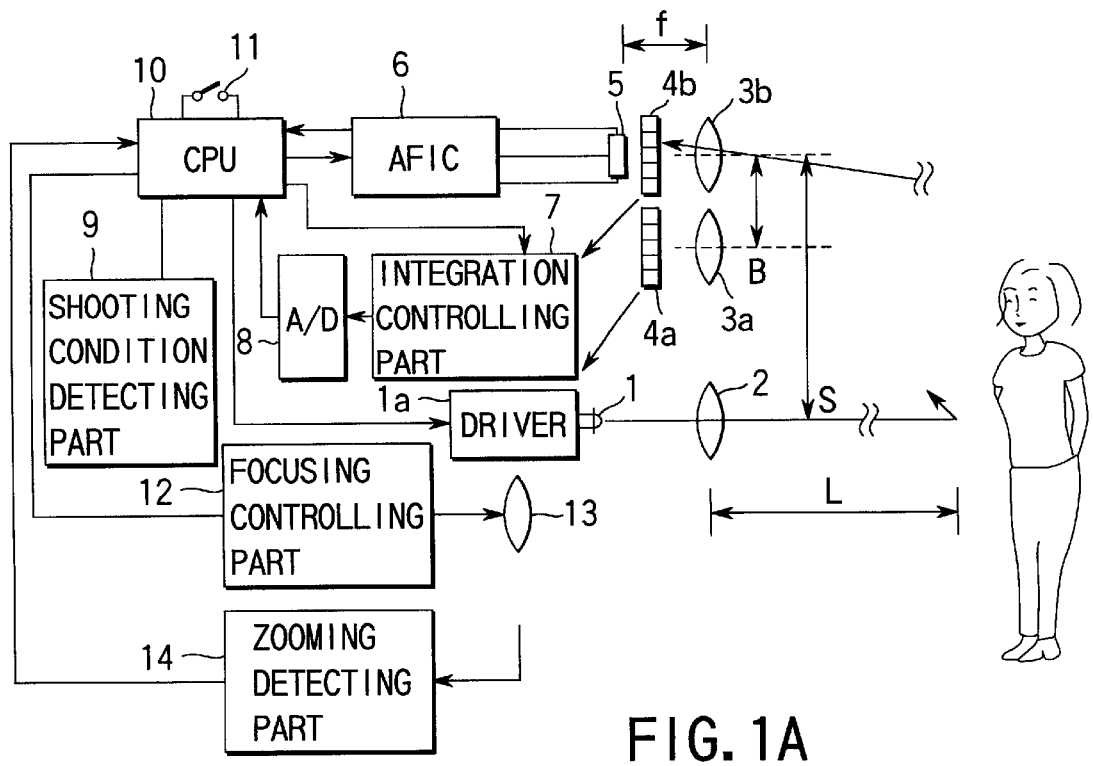
FIG. 1A is a view showing a basic configuration of a distance measuring apparatus for the camera according to the present invention.

FIG. 1A is a view showing a basic configuration of the distance measuring apparatus for the camera according to the present invention.

As shown in the figure, an output terminal of a central processing unit (CPU) 10 consisting of a one-chip micro computer etc. is connected to an input terminal of a driver circuit 1a and a light-casting lens 2 is arranged at a predetermined position in a light-casting direction of an infrared light emitting diode (hereinafter referred to as IRED) 1 connected to this driver circuit 1a. On an optical path of reflected light from the subject exposed to the light from the IRED 1, arranged are a pair of light-receiving lenses 3a, 3b and two sensor arrays 4a, 4b each of which is composed of fine, light detecting devices (sensors), and in the rear of the sensor array 4b, arranged is a light position-sensing device (hereinafter referred to as PSD) 5.

An output terminal of this PSD 5 is connected to an input terminal of the CPU 10 via an autofocus IC (herein after referred to as AFIC) 6.

An output terminal of the CPU 10 is further connected to an input terminal of the integration controlling part 7 and an output terminal of the above-mentioned integration controlling part 7 is connected to an input terminal of the CPU 10 via an A/D converter 8. Further, an output terminal of the CPU 10 is connected to an input terminal of the focusing controlling part 12, and this focusing controlling part 12 is connected to the taking lens 13 via a mechanical device not shown in the figure. In addition, a shooting condition detecting part 9, a release switch 11, etc. are also electrically connected to the CPU 10.

With such a configuration, the CPU 10 executes general sequential control of the camera, drives the taking lens 13 with a medium of the focusing controlling part 12 to adjust the focus on the subject 20 in accordance with a distance measuring result of the distance measuring apparatus.

Hereafter, the principle of the AF based on the above-mentioned construction will be described in detail.

First of all, in the active type AF, the CPU 10 provides electric current to the IRED1 via the driver circuit 1a and controls its emission, a signal light component reflected from the subject 20 falls on the PSD 5 via the light-receiving lens 3b.

This incident position x satisfies the following expression together with the subject distance L, using the distance S between the light-casting lens and the light-receiving lens and the focal distance f of the light-receiving lens 3b:

$$x = S*f/L. \tag{1}$$

Therefore, if the x is detected, the distance L can be obtained. Here, since the PSD 5 outputs two electric current signals dependent on the light incident position x, the AFIC 6 calculates these output signals and outputs a signal dependent on the x to the CPU 10.

The CPU 10 determines the focusing distance by performing an operation based on the expression (1) using this signal dependent on the x. In this way, in the active type AF, the distance measuring apparatus casts the light from the camera by means of IRED 1 and performs distance measurement based on the light reception signal of its reflected light; therefore the operation thereof has no relationship to the contrast and luminance of the subject image.

On the other hand, in the passive type AF, the distance measuring apparatus does not require the operation of casting light, and therefore does not depend on the subject distance, and can perform excellent distance measurement even for a long distance.

That is, the passive type AF is a method whereby a amount of relative displacement between the signals of the subject image detected by two sensor arrays (which is the result of the parallax of the two light-receiving lenses 3a, 3b) is obtained; its principle lies in the triangulation as the active type AF. However, to obtain the amount of relative displacement, it is necessary to obtain the image signals; therefore the sensor arrays 4a, 4b are used to generate light signals in a predetermined range which are dependent on the relative displacement, being large if it is large and vice versa. DC signals from each of the sensor arrays 4a, 4b are integrated to obtain voltage signals. To get satisfactory image signals, it is necessary to set an integral value of each DC signal in a dynamic range of the A/D converter 8, and to this end the CPU 10 controls the integration controlling part 7 while monitoring the result of the A/D conversion.

Figure 1B:
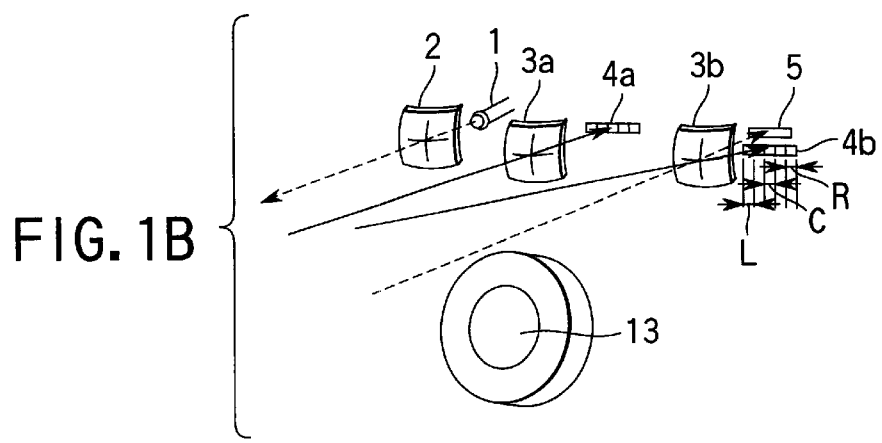
FIG. 1B is a view showing a block diagram of its optical system.

Here, a relationship of the sensor array 4b and PSD 5, by way of example, is just as shown in FIG. 1B. That is, in FIG. 1B, both light receiving lenses 3a, 3b and a light-casting lens 2 are arranged above the taking lens 13. On the optical axes of both light-receiving lenses 3a, 3b arranged are sensor arrays 4a, 4b and just above the sensor array 4b, arranged is the PSD 5. In such a positional configuration, the IRED1 is made to cast the light so that the reflected light from the subject falls on the PSD 5.

In the passive type AF, by selecting areas of an image to be used for distance measurement, for example by using independently a central part C, a left part L, and a right part R of the sensor array 4b in FIG. 1B, distance measurement at three points on a horizontal line in the viewfinder picture frame can be performed. These correspond to three points L, C, and R represented by a numeral 4c in FIG. 1C.

Figure 1C:
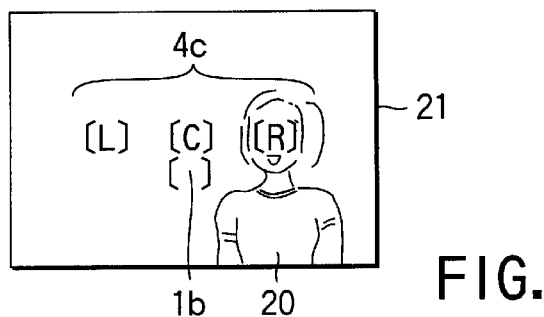
FIG. 1C is a view showing the viewfinder picture frame when taking a picture.

In contrast to this, the active type AF can perform distance measurement at a point, represented by a numeral 1b of FIG. 1C, on which the light from the IRED 1 is cast.

In the present invention, the CPU 10 changes above-mentioned distance measuring methods in accordance with an output of the shooting condition detecting part 9. Details of this will be described later.

Based on these basic principles in the above, the first embodiment of the present invention will be described.

The distance measuring apparatus for the camera according to the first embodiment is characterized in that the distance measuring apparatus changes the distance measuring methods in accordance with the zooming position of the taking lens 13, namely information of the focal distance or the angle of field thereof, obtained by using the zooming detecting part 14.

FIGS. 3A to 3C is a view showing the relationship between the angle of view of the camera 30 and the subject 20.

In this figure, numerals 20a and 20b do not denote a main subject but less significant miscellaneous subjects, for example trees etc. Arrows in figure show points of distance measurement. Two pairs of V-shaped broken lines drawn from the camera indicate angles of view in a telephoto setting and in a wide-angle setting, respectively. In addition, two pairs of two solid lines that are perpendicular to the optical axis of the camera, pertaining to a range of $\Delta L$ indicate the depth of field in a telephoto setting and in a wide-angle setting, respectively.

The depth of field in the telephoto setting is generally shallow, although depending on a condition of the diaphragm of the taking lens; whereas that in the wide-angle setting is deep (i.e. $\Delta L_W > \Delta L_T$). Moreover, in a wide-angle setting, because of the relationship between the angle of view and the focal length of the lens, a subject located at a long distance is viewed smaller on the viewfinder as matter of fact of photography, the subject is photographed at a relatively short distance in many cases.

On the ground of this situation, it is considered to be good enough that a distance to a subject should be measured by the active type AF that is good at short distances. In addition to this fact, since the depth of field is deep in a wide-angle setting, it is not likely that the focusing of the lens goes to dull even when the accuracy of distance measurement may decrease for a long distance. So, not only because of the ground but also because of this fact, it is preferable to choose the active type AF that is simpler yet able to perform distance measurement.

However, since in the first embodiment the active type AF can perform distance measurement only for the center in the viewfinder picture frame, when a subject of a person does not exist at the center in the viewfinder picture frame as the framing shown in the FIG. 1C, the passive type AF capable of distance measurement for a wider area is made to be operated subserviently.

Further, as can be understood from FIG. 3A, if the left and right distance measuring points in the viewfinder picture frame when being in the telephoto setting are set to lie in directions of a predetermined angle ±0, which are original points in a wide-angle setting, there is liable to occur a phenomenon that miscellaneous subjects positioned close to the frame such as tress etc. are measured and hence the above-mentioned miscellaneous subjects become in focus whereas the person becomes out of focus.

Figure 5:
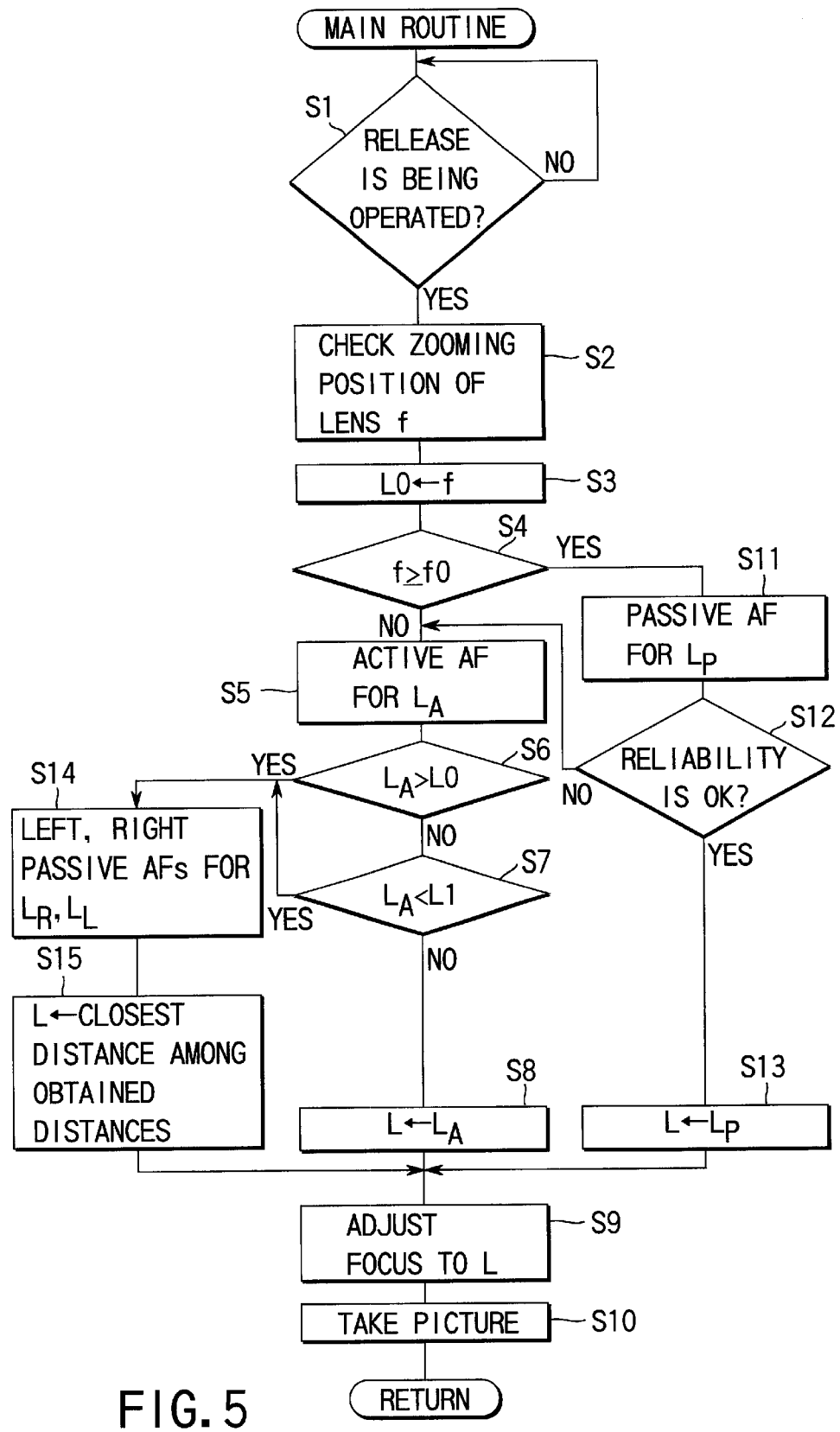
FIG. 5 is a flowchart showing an operation sequence of the distance measuring apparatus for the camera according to the first embodiment.

Considering the above matters, in the first embodiment, the CPU 10 is made to control the change of distance measuring methods and determine the focusing distance based on the sequence shown in the flowchart of FIG. 5. Hereafter, the determination of the focusing distance will be described in detail.

That is, first the CPU 10 is monitoring a timing when a user operates the release switch 11 (step S1). If the CPU 10 detects manual operation of the above-mentioned release switch 11, then the CPU 10 detects the zooming position of the lens at that time (step S2) based on an output signal of the zoom encoder which is attached to the taking lens 13 (not shown in the figure) etc.

Subsequently, from this zooming position f, the predetermined distance $L_0$ which is to be used in the after-mentioned step S6 is determined (step S3). From this result, if the zooming position f is larger than the predetermined focal distance $f_0$ (step S4), the CPU determines that the taking lens 13 is in a telephoto setting and further assumes that a subject is mostly at a long distance. Consequently the center of the viewfinder picture frame is measured by the passive type AF (step S11). From this zooming position f, a predetermined distance $L_0$ which is to be used in the later-mentioned step S6 is determined (step S3), and the reliability is judged with an image signal obtained at the distance measurement (step S12).

In the case of the passive method which uses the image signal of the subject, accurate distance measurement cannot be performed when a scene is dark or a subject lacks contrast and therefore it is necessary to do the reliability judgment. Concretely, known methods are contrast judgment where the difference between the maximum and the minimum of the image signal in the distance measuring area is compared to a predetermined value and luminance judgment where whether image has a predetermined luminance is checked. That is, in a case where the contrast is low or the luminance of the subject is insufficient, the reliability of the distance measuring result can be judged to be low. Further, if the result of the reliability judgment is low, the flow of the operations is switched to the step S5, where the distance measurement by the active type AF is performed. Here, the $L_0$ in the step S6 is set to a long distance larger than 10 m when the lens is in a telephoto setting so that the flow should not switched to the step S14 except a case where the distance is larger than the predetermined distance $L_0$ because of the reason as described above.

Figure 4A:
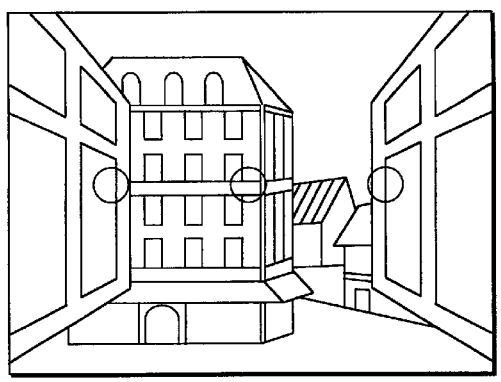
FIG. 4A is a view showing an example of framing of a scene to be taken in the first embodiment.

In this way, by performing distance measurement in both left and right directions, focusing to a miscellaneous subject is prevented in a scene as shown in FIG. 3C. By the way, as an example of a scene where the distance measuring result at the center indicates a very far distance and miscellaneous subjects at the left and right in the viewfinder picture frame are located at a short distance, such a case as shown in FIG. 4A can be thought. In this case, since the contrast of a subject is judged to be sufficient in the distance measurement at the center etc. at the step S11, the flow at the step S12 is not switched to the "NO" branch.

On the other hand, when the flow is switched to the step S4, that is, the lens is judged to be in a wide-angle setting, the active type AF is performed (step S5). At this time, since the lens in a wide-angle setting, the $L_0$ at the step S6 is set to 4 m. If the subject distance $L_A$ at the center is within 4 m, the CPU 10 assumes that the subject at the center in the viewfinder picture frame is a main subject and the distance measuring result at the center is adopted as the focusing distance L at the step S8.

However, if the $L_A$ is too small and below the predetermined distance $L_1$ (for example 1.5 m), the flow at the step S7 is switched to the step S14 because the depth of field is shallow, and the distance measuring results in left and right directions are also considered. As a result, even in a scene shown in FIG. 4C, it can be prevented that the focus is adjusted on a background wall and a person 20 becomes out of focus.

After distance measurement is performed in right and left directions, the closest distance is chosen and this value is set to a focusing distance L at the step S15. Then, the focus is adjusted to the distance L (step S9) and a photographing operation is done (step S10).

Figure 4B:
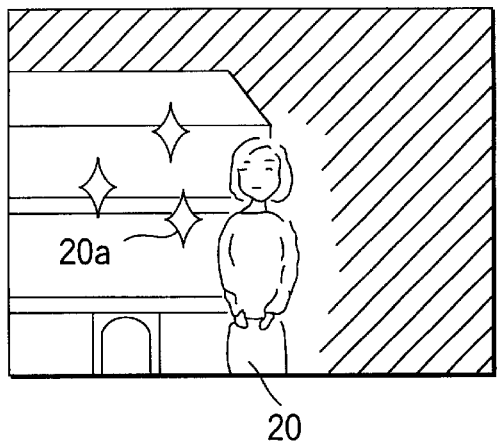
FIG. 4B is a view showing an example of the framing of a scene to be taken in the first embodiment.

By means of this method, the focus is actually and correctly adjusted on a person in a situation where a person and a background are taken in a picture simultaneously as in a night scene picture of FIG. 4B. In other words, in this situation, the reliability of the passive AF is low because the main subject is dark. Moreover, it is very likely that the reliability is judged to be sufficient when the background is measured and the focus is adjusted on the background because the background has distinct contrast.

In such a scene, if the active type AF is performed, the background light is virtually eliminated and the distance measurement is performed by using the signal light that was cast from the camera and reflected from a person at the center, so that correct focusing can be carried out. These scenes are mostly intended to take in a person and a background, and therefore the scene is mostly photographed with a wide-angle setting of a lens. Therefore, the flow at the step S4 is switched to the step S5, where the active type AF is carried out and a distance to the person is measured to find the distance $L_A$. Even if this distance is within the predetermined distance, the focus is adjusted to $L_A$ correctly at the steps S7 and S8. Further even if the flow is switched to the step S14, the flow proceeds to the step S15 where the closest distance is chosen, so that the focus is adjusted on the person correctly. In this way, even in a night scene at which the conventional passive AFs are not good, correct focusing can be carried out.

As described above, according to the first embodiment, the focus can be adjusted on the person 20 accurately by virtue of the above-mentioned configuration and the controlling even in a night scene as shown in FIG. 4B where conventional distance measurements may perform erroneous distance measurement with high probability.

Hereafter, a second embodiment according to the present invention will be described.

Figure 6A:
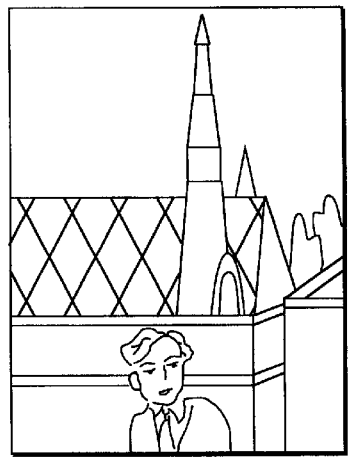
FIG. 6A is a view showing an example of the framing of a scene to be taken in the second embodiment.
Figure 6B:
FIG. 6B is a view showing an example of the framing of a scene to be taken in the second embodiment.

It is said that about 10 percent of photographed pictures in general is a photograph in the portrait framing, for example, as shown in FIGS. 6A and 6B. Further, a greater part of that portion is a portrait of a person as shown in FIG. 6B.

In such framing, it is good enough only to give priority to the distance measurement at the center in the viewfinder picture frame, and also it is probable that the subject is at a short distance. On the other hand, in framing where a high building is intended to be taken including its top and for this reason a person is positioned at an extreme corner or bottom in the viewfinder picture frame, generally a wide-angle setting of a lens is employed.

Figure 7A:
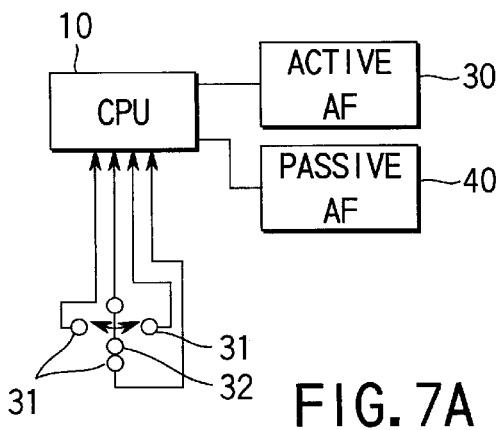
FIG. 7A is a view showing a construction of the distance measuring apparatus according to the second embodiment.
Figure 7B:
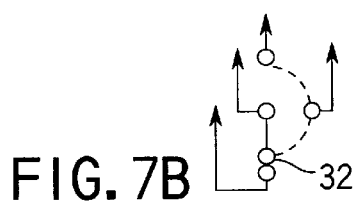
FIG. 7B is a view showing a detailed construction of a pendulum switch 32.

Here, FIG. 7A is a conceptual view of a camera having a switch 32 for detecting the attitude of the camera such as attitudes for the landscape/portrait framing and an attitude of inclination as shown in FIG. 7A as well as the active type and passive type AFs.

By the way, a main part of the camera is similar to the one described previously in FIG. 1.

When the camera is held for the landscape framing as shown in FIG. 7A, a movable contact point of a pendulum switch 32 makes contact with a center contact point 31; when the camera is held for the portrait framing, the movable contact point makes contact with either of contact points 31 arranged at both sides.

In this second embodiment, the CPU 10 detects for which framing the camera is held, landscape or portrait, by detecting whether a signal flows between the movable contact point and one of these three contact points 31.

Figure 8:
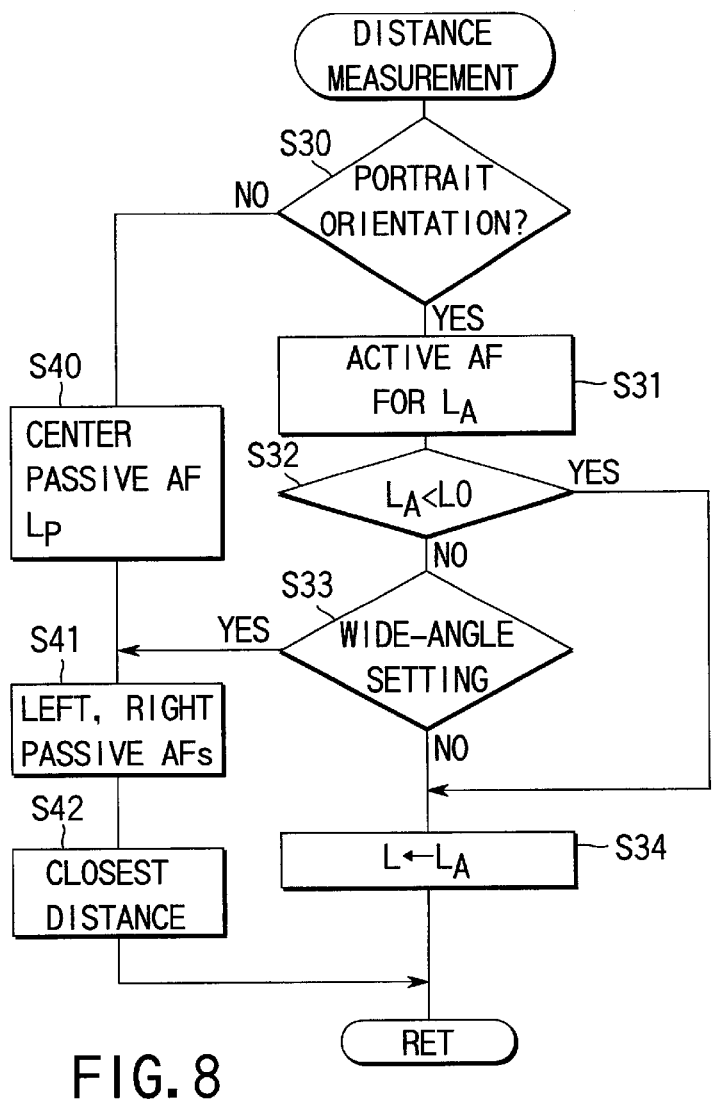
FIG. 8 is a flowchart showing a distance measuring sequence performed by the distance measuring apparatus for the camera according to the second embodiment.

Hereafter, with reference to a flowchart of FIG. 8, a distance measuring sequence of the distance measuring apparatus for the camera according to the second embodiment will be described.

First, the CPU 1 detects the framing of the camera, portrait or landscape (step S30). Then, because of the above-described reason, the active type AF is prioritized when the camera is held for the portrait framing (step S31).

This scheme is intended to cope with an assumed scene as shown in FIG. 6B. The scheme is expected to solve a conventional problem that, when shooting a person close up, distance measuring apparatuses employing the passive type AF mostly fail to measure a distance to the person correctly because the cheek, ridge of the nose, etc. of the person close up lack contrast.

Normally, in the passive type AF, if the center in the viewfinder picture frame is in low contrast, it is often the case that a CPU tries to find a point having rich contrast in the vicinity of the center. However in a scene like this, the focus is liable to be adjusted on the shoulders of a person and as a result the face of the person may become out of focus.

Figure 7C:
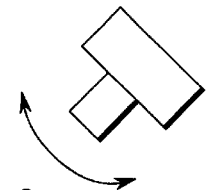
FIG. 7C is a view for explaining the change in an attitude condition of the camera.

On the contrary, the active type AF that concerns only one point at the center is good at such scenes at a short distance and having low contrast; therefore if the flow at the step S30 is switched to the step S31 and the active method is selected, accurate focusing can be carried out. However, in a scene as shown in FIG. 6A, that is, where the subject distance $L_A$ detected at the step S31 is larger than the predetermined distance $L_0$ and also the lens is in a wide-angle setting (steps S32, S33), the left and right areas in the viewfinder picture frame are also measured (step S41). Then, from these results, the closest distance is selected as the subject distance (step S42). At this time, an attitude of the camera as shown in FIG. 7C may also be considered. The is because the camera is often turned up when shooting a building including its top.

On the other hand, if the flow is switched to the "YES" branch at the step S32, the focusing is carried out using the results of the initially-chosen active type AF (step S34).

Figure 4C:
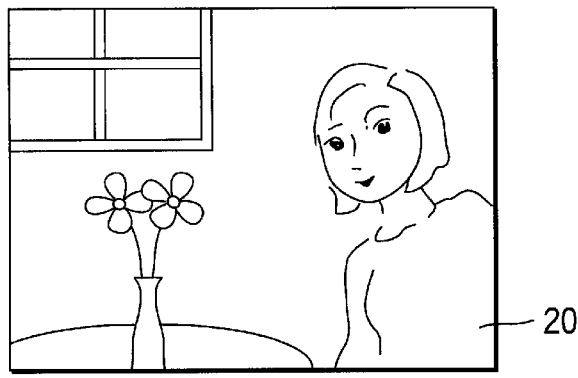
FIG. 4C is a view showing an example of the framing of a scene to be taken in the first embodiment.

In this embodiment, the passive type AF is selected for the left and right as well as for the center in the viewfinder picture frame when being in the landscape framing, which is intended to act as a countermeasure against such framing as shown in FIG. 4C. Further, the sequence shown previously in FIG. 5 may be adopted.

As described above, according to the second embodiment, in the portrait framing where there is strong likelihood of existence of a subject in low contrast (the face of a person) at the center in the viewfinder picture frame, the active type AF is prioritized, so that the focus can be adjusted accurately on the targeted subject.

Next, the third embodiment according to the present invention will be described.

Figure 6C:
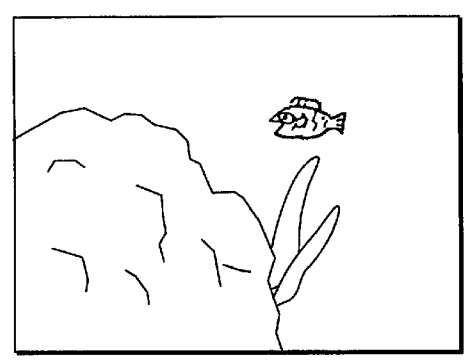
FIG. 6C is a view showing an example of the framing of a scene to be taken in the second embodiment.

The second embodiment is an example where the active type AF is jointly used with the passive type AF with the aim of coping with the assumed scene at which the passive type AF is not good. However, for example, when shooting in the water as shown in FIG. 6C, since the light for the active type AF is absorbed by the water, the passive type AF is preferable in performing high-precision distance measurement.

Figure 9:
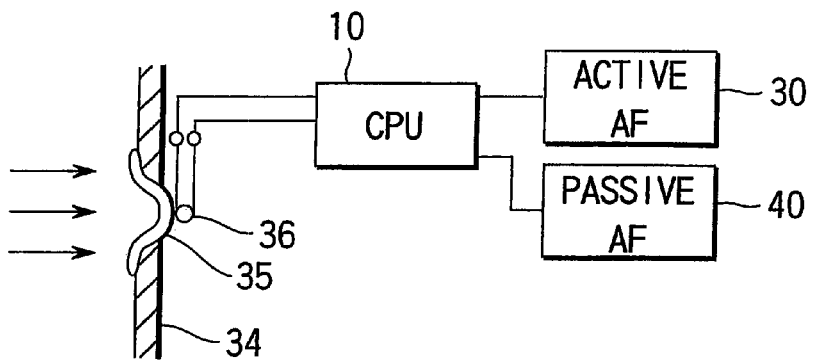
FIG. 9 is a view showing a construction of the distance measuring apparatus for the camera according to the third embodiment.

FIG. 9 is a view showing a configuration of the distance measuring apparatus for the camera according to the third embodiment.

As shown in the figure, a rubber membrane 35 is spanned over the hole on a side 34 of the camera and when the water pressure is exerted on the membrane 35, the switch 36 is activated by the water pressure through the membrane 35. With this device, distance measurement that always gives priority to the passive type AF in the water is realized.

Figure 10:
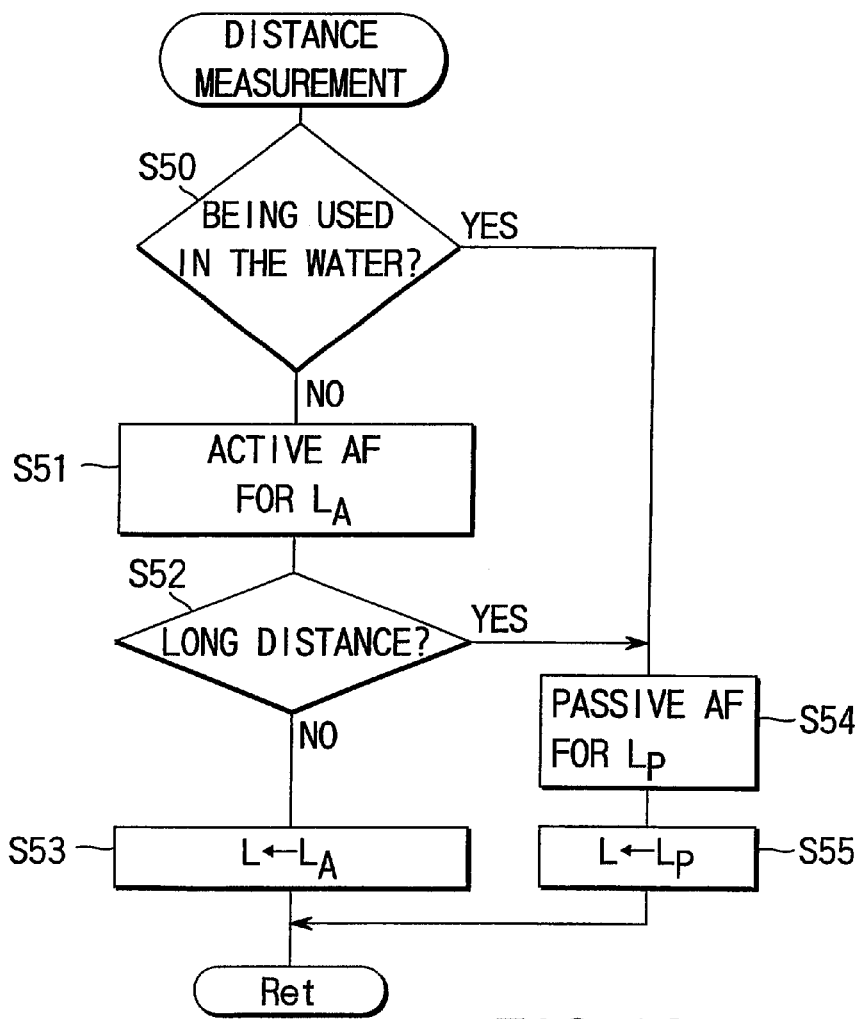
FIG. 10 is a flowchart showing an operation sequence of the distance measuring apparatus for the camera according to the third embodiment.

Hereafter, with reference of the flowchart of FIG. 10, operations of the distance measuring apparatus for the camera according to the third embodiment will be described in detail.

That is, a CPU 10 detects a switching operation of the switch 36 and chooses either of the active type AF (step S51) or the passive type AF (step S54) depending on the result. As described above, the passive type AF is prioritized in the water. Moreover, also even on the land but only when the distance measured by the active type AF is long, the flow at the step S52 is switched to the step S54, where the passive type AF is prioritized.

Further, on the land, the active-type AF is prioritized and distance measurement is thereby performed. If the distance measuring result does not indicate long distance, the result by the active AF is adopted; If the distance measuring result indicates long distance, the passive-type AF is prioritized, distance measurement is thereby performed, and the result so obtained is adopted. That is, in the case where a subject is on the land and at a long distance, the active-type AF and the passive-type AF are used jointly (step S52). Thus, either of the distance $L_A$ obtained by the active type AF or the distance $L_P$ obtained by the passive type AF is stored in L (step S53, S55) and the flow goes out of this sequence.

Since the angle of view becomes narrower in the water due to the refractive index of the water, generally cameras for this purpose are often designed to have wide-angel lenses. Therefore, the active type AF is prioritized on the land because of the same reason as that in the first embodiment.

As described above, according to the third embodiment, the distance measuring scheme whereby the distance measuring method is changed depending on whether the camera is in the water or not can eliminate useless measurement, hence becoming advantageous in terms of energy saving and time lag reduction.

Next, the fourth embodiment according to the present embodiment will be described.

Figure 2:
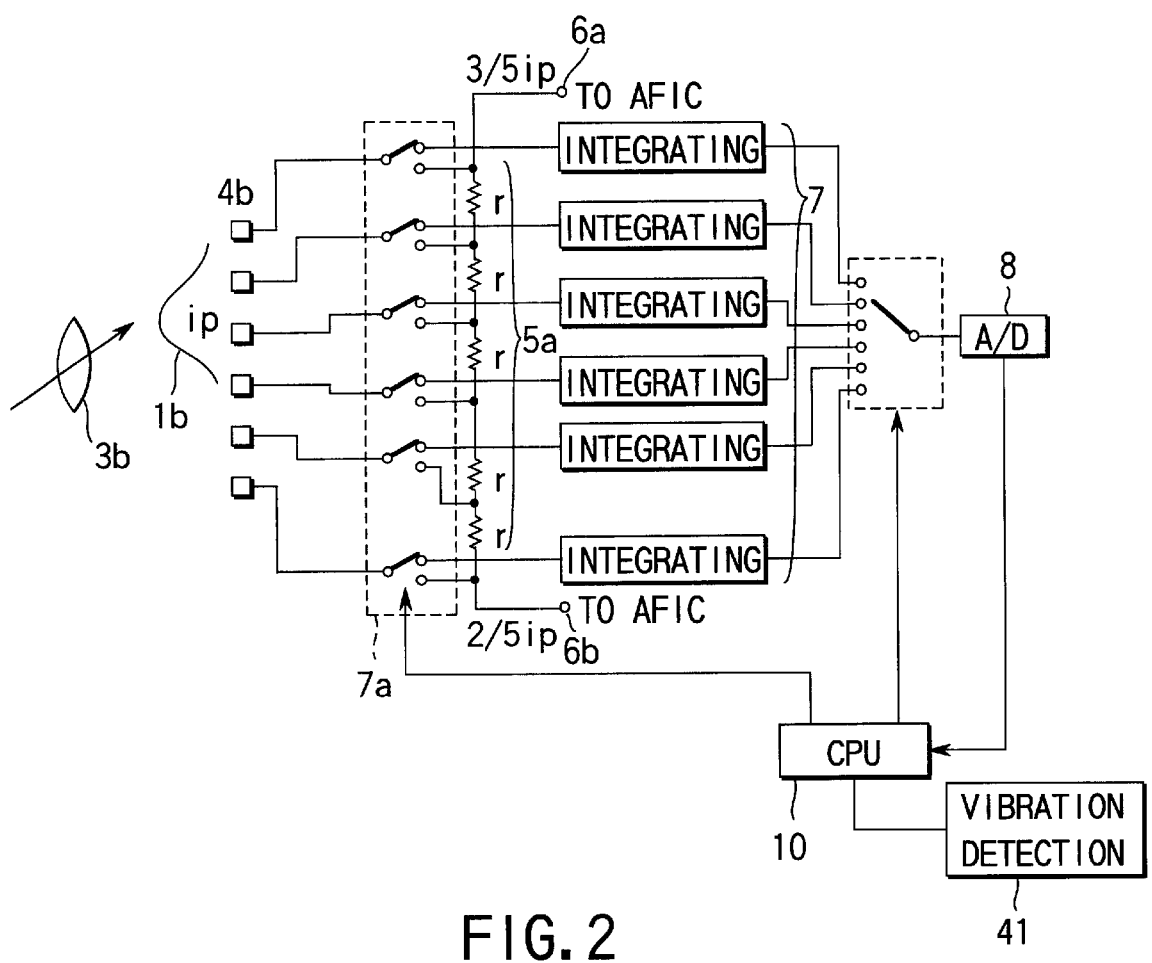
FIG. 2 is a view showing a distance measuring apparatus for the camera where a sensor part is used jointly for the active method and the passive method and that is capable of distance measuring at the same position even when one method is changed to the other.

In the first embodiment whose construction is shown previously in FIG. 1A, the distance measuring area of the active type AF and that of the passive type AF, both of which are at the center in the viewfinder picture frame, are slightly displaced in a vertical direction as shown in FIG. 1C. If a sensor adopts such an electrical configuration as is shown in FIG. 2, the sensor part can be used for the active type AF and the passive type AF; therefore even if one of the methods is changed to the other, the same position in the viewfinder picture frame can always be measured. By the way, in FIG. 2, a numeral 3b represents the light-receiving lens and a numeral 4b does a sensor array.

Each sensor in the sensor arrays 4a, 4b is electrically connected to each of corresponding ports of a switch part 7a and the connection is controlled so as to establish link with either a resistor array 5a or an integration circuit 7. If the sensor array 4a (4b) is connected to the integration circuit 7, the circuit operates in a passive mode for the passive type AF and the CPU 10 leads these output signals sequentially to an A/D converter 8 whereby an image signal can be obtained.

If the sensor array 4a (4b) is connected to the resistor array 5a, the circuit is in an active mode for the active type AF. The operational principle is described in the following: reflected signal light falls on the sensor as shown in FIG. 1B; a third sensor from the top in the figure is most irradiated by the reflected light; ratio of the resistance between that sensor and one of the two electrodes 6a, 6b becomes such as expressed by 2r:3r=2:3; and therefore photocurrent $i_P$ is branched to $3/5 i_P$ and $2/5 i_P$, the ratio of two terms being in a reverse proportion to the ratio of the resistance.

In a short, two electric current signals each of which is dependent on the incident position can be obtained.

This is the same function as that of the PSD 5 of FIG. 1A. Therefore, if these signal currents are entered to the AFIC 6 of FIG. 1A, distance measurement by the active mode becomes possible. If employing such an AF system the CPU 10 uses a signal of a vibration detecting part 41 consisting of an acceleration sensor to be used for an anti-vibration technique for the camera etc., the fourth embodiment according to the present invention is constructed. Hereafter, the forth embodiment will be described.

Figure 11:
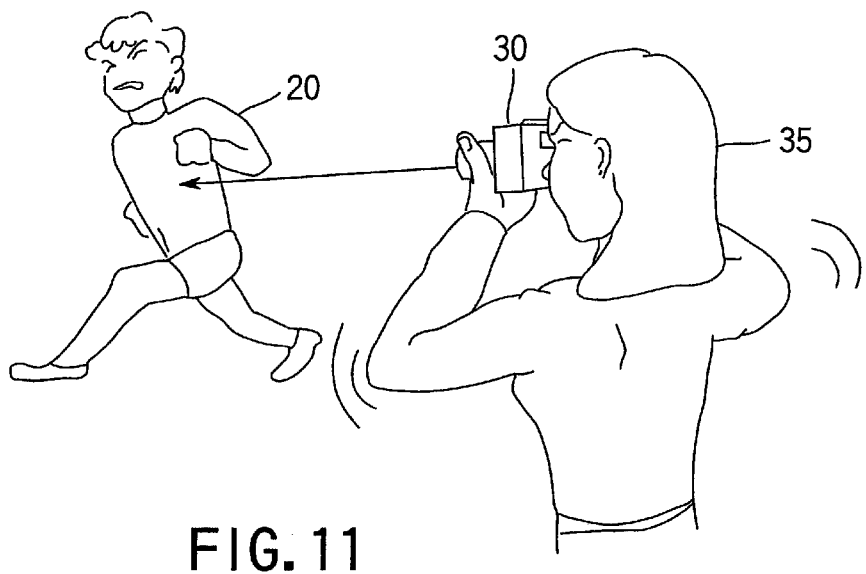
FIG. 11 is a view showing an example of a situation when taking a picture.

When a subject 20 is moving across the viewfinder picture frame as shown in FIG. 11 or the like, a photographer may move the camera so as to catch the subject 20 in the viewfinder picture frame (i.e. framing) with a so-called "shot in a movement" technique and tries to get the best shutter chance. In such a condition, there are many cases where a subject is at the center in the viewfinder picture frame almost invariably and its contrast is low, yet high-speed focusing is required.

Figure 12:
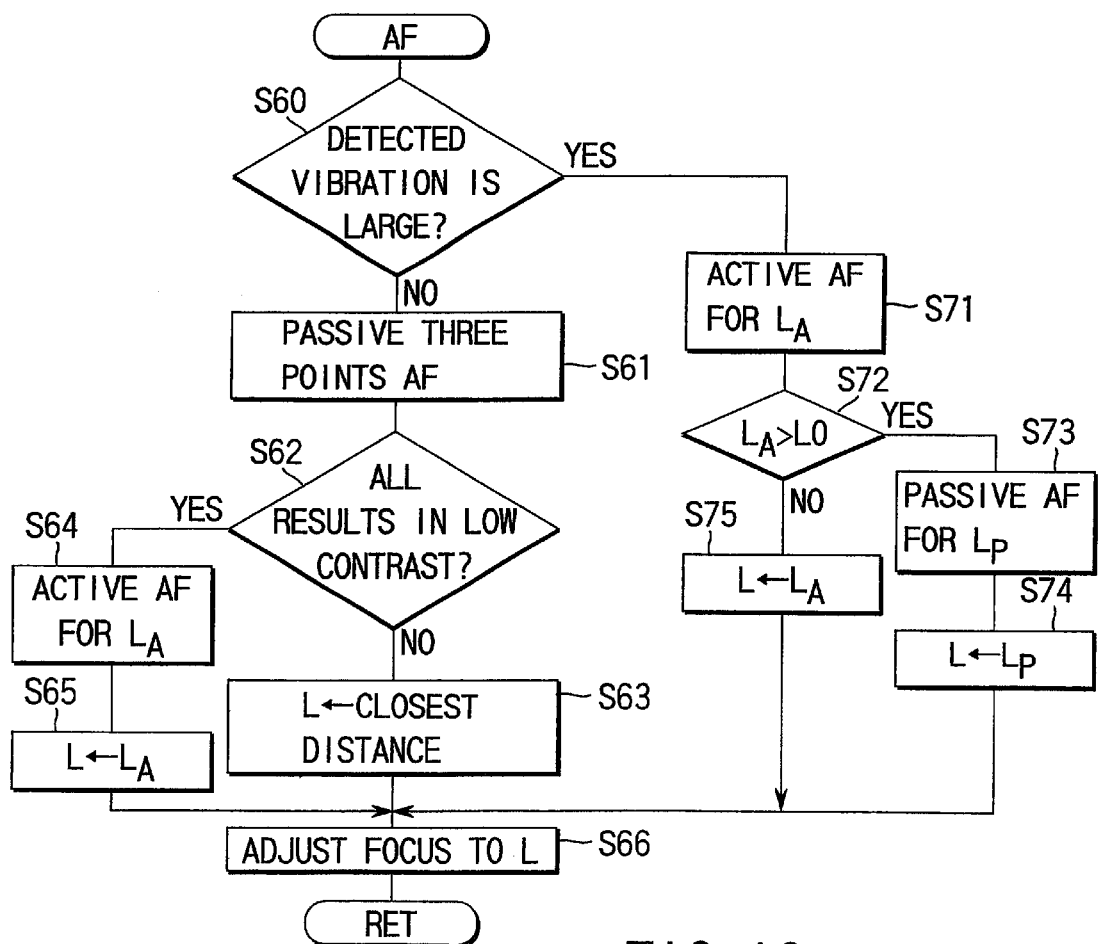
FIG. 12 is a flowchart showing an operation sequence of the distance measuring apparatus for the camera according to the fourth embodiment in detail.

Therefore, in the fourth embodiment, the distance measuring apparatus changes the priorities, that is, which type AF is prioritized, the active type AF or the passive type AF, in accordance with a vibration condition of the camera as shown in FIG. 12. When the vibration is large, the flow at the step S60 is switched to the step S71, where the active type AF is prioritized. If the subject distance $L_A$ measured by the active type AF is not longer than the predetermined distance $L_0$, the result $L_A$ is set to the focusing distance L.

However, if the subject distance $L_A$ is longer than the predetermined distance $L_0$, the passive type AF is carried out at the step S73. However, if the vibration is small, the flow at the step S60 is switched to the step S61, where the passive three points AF is carried out. Only if all the results of the three points are in low contrast, the flow is switched to the step S64, where the active type AF is carried out.

As described above, according to the fourth embodiment, when a rapid distance measuring operation is required in such a case as in the so-called "shot in a movement", the active type AF where the camera emits signal light for distance measuring is made to be prioritized, so that this scheme makes it possible to carry out more rapid focusing than the passive type AF which takes much time for the integration controlling, the cross-correlation operation, etc. and hence the camera capable of surely taking the shutter chance can be provided.

In accordance with 37 C.F.R. § 1.121(b)(iii) a separate sheet(s) with the replacement paragraphs, marked up to show all changes relative to the previous version of the paragraphs, is filed herewith.

As described in the foregoing, according to the present invention, there can be provided the distance measuring apparatus capable of deciding the priority of the two methods, the active method and the passive method, automatically and rapidly, and performing rapid, accurate distance measurement in any shooting conditions, whereby rapid, accurate focusing can be realized in the camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distance measuring apparatus for a camera comprising:

first distance measuring means for measuring a distance to a subject by casting distance measuring light on the subject and using reflected light signal from the subject;

second distance measuring means for measuring a distance to a subject by using an image signal of the subject;

service condition detecting means for detecting a condition when the camera is being held; and controlling means for changing said first and second distance measuring means in accordance with an output signal of this service condition detecting means.

2. A distance measuring apparatus for a camera according to claim 1, wherein said service condition detecting means is an attitude detector sensor for detecting an attitude of the camera.

3. A distance measuring apparatus for a camera according to claim 1, wherein said service condition detecting means is an underwater sensor for detecting whether the camera is in the water or not when being in service.

4. A distance measuring apparatus for a camera according to claim 1, further comprising a camera shake sensor for detecting a condition of camera shake, characterized in that said service condition detecting means detects the condition of the camera shake based on an output of said camera shake sensor.

5. A distance measuring apparatus for a camera having a plurality of distance measuring methods, being designated as first and second methods, comprising:

service condition detecting means for detecting a holding condition when the camera is being held;

zooming detecting means for detecting a zooming condition of said camera; and controlling means for changing said distance measuring methods in accordance with said holding condition and said zooming condition.

6. A distance measuring apparatus for a camera according to claim 5, wherein said first method of distance measuring is such that distance measuring light is cast on a subject and a distance to the subject is measured by using a reflected light signal therefrom and said second method of distance measuring is such that a distance to the subject is measured by using an image signal of the subject.

7. A distance measuring apparatus for a camera according to claim 5, wherein said service condition detecting means is an attitude detector sensor for detecting an attitude of the camera.

8. A distance measuring apparatus for a camera according to claim 5, wherein said service condition detecting means is an underwater sensor for detecting whether the service condition of the camera is in the water or not.

9. A distance measuring apparatus for a camera according to claim 5, further comprising a camera shake sensor for detecting camera shake, characterized in that said service condition detecting means detects a condition of the camera shake based on an output of said camera shake sensor.

10. A distance measuring apparatus for a camera having a plurality of distance measuring methods, being designated as first and second distance measuring methods, comprising:

zooming detecting means for detecting a zooming condition of said camera;

image signal detecting means for detecting an image signal of a subject; and controlling means for changing whether the second distance measuring method is used for measuring after the first distance measuring method is used, or, the first distance measuring method is used for measuring after the second distance measuring method is used in accordance with a result of reliability judgment of said image signal.

11. A distance measuring apparatus for a camera according to claim 10, wherein said first distance measuring method is a method where distance measurement is performed by casting distance measuring light on a subject and using a reflected light signal from the subject, and said second distance measuring method is a method where distance measurement is performed by using the image signal of the subject.

12. A distance measuring apparatus of a camera having a plurality of distance measuring methods, being designated as first and second distance measuring methods, comprising:

zooming detecting means for detecting a zooming condition of said camera; and controlling means for changing whether the second distance measuring method is used for measuring after the first distance measuring method is used, or, the first distance measuring method is used for measuring after the second distance measuring method is used in accordance with the zooming condition detected by this zooming detecting means.

13. A distance measuring apparatus for a camera according to claim 12, wherein said first distance measuring method is a method where distance measurement is performed by casting distance measuring light on a subject and using a reflected light signal from the subject, and said second distance measuring method is a method where distance measurement is performed by using the image signal of the subject.

14. A distance measuring apparatus of a camera having a plurality of distance measuring methods, being designated as first and second distance measuring apparatus methods, comprising:

shooting condition detecting means for detecting a shooting condition; and controlling means for changing whether the second distance measuring method is used for measuring after the first distance measuring method is used, or, the first distance measuring method is used for measuring after the second distance measuring method is used in accordance with the shooting condition detected by this shooting condition detecting means.

15. A distance measuring apparatus for a camera according to claim 14, wherein said first distance measuring method is a method where distance measurement is performed by casting distance measuring light on a subject and using a reflected light signal from the subject, and said second distance measuring method is a method where distance measurement is performed by using an image signal of the subject.

16. A distance measuring apparatus for a camera comprising:

first distance measuring means for measuring a distance to a subject based on a signal generated when distance measuring light is cast on a subject positioned in the center of the viewfinder picture frame and reflected signal light from the subject is received;

second distance measuring means for measuring a distance to a subject by using the light reception signal corresponding to said subject image;

focal distance information detecting means for detecting focal distance information of a taking lens of the camera; and controlling means capable of distance measurement by means of said first and second distance measuring means regardless of an output of said focal distance information detecting means, wherein the controlling means changes whether the second distance measuring method is used for measuring after the first distance measuring method is used, or, the first distance measuring method is used for measuring after the second distance measuring method is used in response to the output of the said focal distance information detecting means.

17. A distance measuring apparatus for a camera comprising:

a holding condition detector sensor for detecting a holding condition when the camera is being held;

a light sensor for detecting light from a subject;

a controlling circuit for changing a passive distance measuring mode where distance measurement is performed based on an image signal outputted from the said light sensor and an active distance measuring mode where distance measurement is performed based on a reflected light signal outputted from said light sensor when light is cast on the subject and reflected signal light from the subject is received, selectively; and characterized in that:

said control circuit changes said passive distance measuring mode and said active distance measuring mode in accordance with an output of said holding condition detector sensor.

18. A distance measuring apparatus for a camera according to claim 17, wherein said holding condition detector sensor is a sensor for detecting an attitude of the camera.

19. A distance measuring apparatus for a camera according to claim 18, wherein said control circuit changes its mode to said active distance measuring mode and performs distance measurement when said control circuit detects that the camera is being held for the portrait framing.

20. A distance measuring apparatus for a camera according to claim 19, wherein said control circuit changes again said passive distance measuring mode and said active distance measuring mode in accordance with a result of said active distance measuring mode.

21. A distance measuring apparatus for a camera according to claim 17, wherein said holding condition detector sensor is an underwater sensor for detecting whether the service condition of the camera is in the water or not.

22. A distance measuring apparatus for a camera according to claim 21, wherein said control circuit changes its mode to said active distance measuring mode and performs distance measurement when said control circuit detects that the service condition of the camera is in the water by the said holding condition detector sensor.

23. A distance measuring apparatus for a camera according to claim 22, wherein said control circuit changes again said passive distance measuring mode and said active distance measuring mode in accordance with a distance measuring result by said active distance measuring mode.

24. A distance measuring apparatus for a camera according to claim 17, wherein said holding condition detector sensor is a sensor for detecting a condition of camera shake.

25. A distance measuring apparatus for a camera according to claim 24, wherein said control circuit changes its mode to said passive distance measuring mode and performs distance measurement when said condition detector sensor detects camera shake.

26. A distance measuring apparatus for a camera according to claim 25, wherein said control circuit changes again said passive distance measuring mode and said active distance measuring mode in accordance with a distance measuring result by said active distance measuring mode.

27. A distance measuring apparatus for a camera according to claim 17, wherein said control circuit performs distance measurement in a distance measuring mode that was changed so in accordance with an output of said holding condition detector sensor and changes again said passive distance measuring mode and said active distance measuring mode in accordance with a distance measuring result of the initially-chosen distance measuring mode.

28. A distance measuring apparatus for a camera according to claim 17, wherein said control circuit performs distance measurement by a distance measuring mode that was changed so in accordance with an output of said condition detector sensor and changes again said passive distance measuring mode and said active distance measuring mode in accordance with a distance measuring result of the initially-chosen distance measuring mode and the focal length information of a taking lens.

* * * * *